（12）United States Patent
Eberbach

(10) Patent No.: US 7,600,665 B2
(45) Date of Patent: Oct. 13, 2009

(54) METHOD FOR WELDING CONDUCTORS

(75) Inventor: Jost Eberbach, Buseck (DE)

(73) Assignee: Schunk Ultraschalltechnik GmbH, Wettenberg (DE)

( * ) Notice: Subject to any disclaimer, the term of this patent is extended or adjusted under 35 U.S.C. 154(b) by 267 days.

(21) Appl. No.: 10/577,013

(22) PCT Filed: Oct. 28, 2004

(86) PCT No.: PCT/EP2004/012221

§ 371 (c)(1),
(2), (4) Date: Jul. 13, 2006

(87) PCT Pub. No.: WO2005/042202

PCT Pub. Date: May 12, 2005

(65) Prior Publication Data

US 2006/0283912 A1   Dec. 21, 2006

(30) Foreign Application Priority Data

Oct. 29, 2003  (DE) ............................... 103 50 809
Dec. 18, 2003  (DE) ............................... 103 59 368

(51) Int. Cl.
*B23K 20/10* (2006.01)
(52) U.S. Cl. ................. 228/110.1; 228/1.1; 228/44.7
(58) Field of Classification Search ................ 228/1.1, 228/110.1
See application file for complete search history.

(56) References Cited

U.S. PATENT DOCUMENTS 3,410,983 A * 11/1968 Deutsch et. al. ............ 219/109
3,890,831 A    6/1975 Cusick et al.
4,596,352 A    6/1986 Knapp
4,631,685 A   12/1986 Peter
4,746,051 A *  5/1988 Peter ........................ 228/102
5,941,443 A *  8/1999 Steiner et al. ............. 228/1.1
6,393,924 B1 * 5/2002 Eder et al. .................. 73/850

FOREIGN PATENT DOCUMENTS

| DE | 2149748 | 4/1972 |
| DE | 4429684 A1 * | 2/1996 |
| DE | 3719083 | 9/1998 |
| EP | 0208310 | 1/1987 |
| EP | 0701876 | 3/1996 |
| FR | 2302172 | 9/1976 |

OTHER PUBLICATIONS

Written translation of DE 4429684, Wagenbach et al., published Feb. 1996.*

* cited by examiner

*Primary Examiner*—Jessica L Ward
*Assistant Examiner*—Devang Patel
(74) *Attorney, Agent, or Firm*—Dennison, Schultz & MacDonald

(57) ABSTRACT

The invention concerns a method for welding electric conductors using ultrasound, whereby the conductors (32) are introduced into a compression chamber (30) that is bounded by at least two boundary elements and are welded after the compression chamber is closed, whereby ultrasound is applied via a sonotrode (16) and the conductors to be welded are pressurized, preferably via a counter electrode. In order to be able to check the quality of the welding site using simple measures, it is proposed that after welding (32) the conductors, the compression chamber (30) is decompressed and then an ultrasound pulse is applied to the welded conductors with simultaneous application of pressure to these, and subsequently the spacing difference between the sonotrode (16) and the counter electrode (18) is measured.

15 Claims, 3 Drawing Sheets

METHOD FOR WELDING CONDUCTORS

This application is a filing under 35 USC 371 of PCT/EP2004/012221, filed Oct. 28, 2004.

BACKGROUND OF THE INVENTION

The invention concerns a method for welding electric conductors such as litz wires using ultrasound, especially litz wires among one another to produce transit or end nodes, or litz wires with a support, wherein the conductors are introduced into a compression chamber bounded by at least two bounding elements and are welded after the compression chamber is closed, wherein ultrasound is applied via a first element such as a sonotrode and the conductors to be welded are subjected to pressure via the first element or a second element such as a counter electrode, and wherein a characteristic magnitude of the compression chamber is measured. The invention also relates to a method for the quality verification of conductors welded in a compression chamber of an ultrasound welding device, especially litz wires welded into a transit or an end node, or litz wires welded on a carrier, whereby the conductors to be welded are arranged at least between a first element applying ultrasound, such as a sonotrode, and a second element, such as a counter electrode, whereby the conductors are subjected to pressure via the second or the first element. Finally the invention relates to a method for verifying the quality of welded conductors, especially welded litz wires such as transit or end nodes or litz wires welded on a support.

In the ultrasound welding of a node, several litz wires, such as copper conduits, which in turn consist of several strands, are introduced into a compression chamber, compressed, and then brought into relative vibration toward one another by ultrasound. The friction of the strands among one another leads to a welding of the surfaces so that a solid node exists after the welding. During the compression and welding, the volume of the compression chamber diminishes. This change in volume can be measured by displacement pickups and used as a comparison value for checking quality. The strength of the node is the decisive quality criterion for the process of ultrasound welding.

In order to determine the strength of corresponding nodes, the nodes can be measured destructively or non-destructively, by pulling or peeling, via a type of hardness testing (splice checker).

One method for regulating the course of the process for quality control in the ultrasound welding of workpieces can be found in EP-B-0 208 310. In this method, in activating the ultrasound energy, a sonotrode of an ultrasound welding device is lowered onto a workpiece lying on an anvil, whereby a null balance takes place when the sonotrode is placed upon the workpiece, in order to subsequently activate the sonotrode and to allow a desired deformation path to pass through.

A method for the ultrasound welding of thermoplastic materials is known from SU-A-757 337, in which the depression depth of the sonotrode, and therewith the deformation of the workpieces during the welding process, is recorded via a displacement pickup directly applied to the sonotrode. The welding process is terminated with a sign change of the second temporal derivation of the path signal.

A method, a device, and a system for producing connections to integrated circuits are described in DE-A-2 149 748. In order to attain improved connections, the introduction of force onto a tool, but also the energy acting upon it, is controlled via the deformation of the parts to be connected, via a displacement pickup.

A regulation of the welding process using ultrasound is known from FR-A-2 302 172 in which the speed of the depression motion of a sonotrode during the welding process is recorded, compared with specified limit values, and the energy supply to the sonotrode is restricted when adjustable thresholds are exceeded.

In WO-A-95/10866 A method and a device for welding conductors are described, with which a defined welding can take place independently of cross section, even when conductors of different cross sections are successively welded in random order. For this, a characteristic magnitude of the compression chamber is measured after compression of the conductors to be welded.

In order to be able to adjust the height and width of a compression chamber that accommodates conductors to be welded, and to be able to set the respective cross section automatically, devices are known, such as those disclosed in EP-B-0 143 936 or DE-C-37 19 083.

SUMMARY OF THE INVENTION

The present invention is based upon the problem of further developing a method of the type mentioned at the beginning such that immediately after the node is produced, it can be checked whether the welding satisfies desired quality standards. The invention also relates to a method for verifying the quality of welded conductors.

The problem is essentially solved in accordance with the invention in that the compression chamber is decompressed after the conductors are welded, and ultrasound is supplied on the welded conductors, after which the characteristic magnitude is measured.

The quality of the welding is checked in accordance with the invention directly in the compression chamber without additional apparatus being required. For this, it is provided in accordance with the invention that the compression chamber is decompressed after welding in order then to provide a short sound impulse on the weld as well as the nodes. If the weld is not solid, the conductors or litz wires that have been placed in vibration by the sound will travel toward the boundary of the decompressed compression chamber. The boundary can consequently yield so that a relatively large change in the path of the second element takes place on the basis of the pressure applied continuously via the second element, such as a counter electrode or anvil. This measure of the change in path, which can be recorded via a displacement pickup, consequently provides information on whether or not the welding meets quality standards. For if only a slight change in path takes place, it can be concluded that the weld has the requisite strength.

Decompression generally means that, for example, a boundary or lateral element of the compression chamber is unlatched or released so that the lateral element is displaced on the basis of the node becoming "soft" yielding to the pressure of the second element, to the extent that the node does not have the requisite strength. As a result of the yielding of the bounding element, the soft node almost flows so that the second element is correspondingly shifted in the direction of the first element. Consequently a characteristic change in path of the second element takes place when the node is not sufficiently strong. The yielding of the bounding element, thus its change in path, can also be used as a characteristic magnitude for drawing inferences about the quality of the node.

By selecting suitable parameters during the test, such as, for example, pressing force, amplitude or duration of the sound, it is possible to differentiate on the basis of the amount of the change in path whether or not the weld or the node is firm, and thus whether or not it satisfies the desired quality standards.

The decompression of the compression chamber in particular takes place in that the compression chamber is bounded by at least three elements, and after welding at least one element of the welded conductors is unlocked or released to the requisite extent. Even moving the element to open the compression chamber fulfills the feature of decompression.

In particular a geometric value such as height, width or diagonals of the compression chamber is to be selected as the characteristic magnitude that enables inferences as to the quality of the weld, whereby the geometric value is recorded by a displacement pickup, for example.

In measuring the diagonals, the compression chamber is moreover apparently closed on its peripheral side. Nonetheless, especially the spacing between the ultrasound-emitting first element (sonotrode) and the pressure-transmitting second element (anvil or counter electrode) is selected as a characteristic magnitude.

In other words, the invention is basically related to a method for welding electric conductors using ultrasound, whereby the conductors are introduced into a compression chamber bounded by at least two bounding elements, and are welded after closing the compression chamber, whereby ultrasound or ultrasound vibrations are applied via a sonotrode and the conductors to be welded are subjected to pressure via a counter electrode. In order to be able to check the quality of the welding point using simple methods, it is proposed that the compression chamber be decompressed following the welding of the conductors, and that then an ultrasound pulse or ultrasound vibration pulse be applied to the welded conductors with simultaneous action of pressure to these, and that subsequently the change in spacing of the sonotrode and counter electrode be measured. While the conductors are being subjected to pressure, one of the bounding elements can yield to the welded conductors due to decompression of the compression chamber, such as releasing one of the bounding elements, to the extent that the conductors experience a deformation in the direction of the bounding element.

A method for checking the quality of welded conductors of the type mentioned at the beginning is in particular distinguished by the following steps:

Introducing the welded conductors into a compression chamber bounded by at least the first and second elements, Compacting and welding the conductors with simultaneous cross section diminution of the compression chamber, Decompressing the compression chamber, wherein the welded conductors remain between the first element and the second element, Renewed application of ultrasound with simultaneous action of pressure on the welded conductors and Measurement of a characteristic magnitude of the compression chamber and/or the shape of the welded conductors.

Here the quality of the welding is evaluated as a function of the measured characteristic magnitude of the compression chamber and/or the shape of the welded conductors.

In particular, height and/or width and/or diagonals of the compression chamber can be measured as characteristic magnitudes of the compression chamber using a displacement pickup, for example.

The renewed application of the ultrasound should take place over a duration T with 10 ms$\leq$T$\leq$250 ms. Moreover, the renewed subjection to ultrasound should follow immediately on the welding process, almost continuing the latter.

In order to ensure that lower quality welds cannot flow into a normal finishing process, a further development of the invention, which is to be emphasized, provides that when a lower quality weld is established on the welded conductors while the open compression chamber continues to be decompressed, ultrasound is applied again to destroy or largely destroy the weld.

If a proper weld is established, a targeted recompression can take place while the compression chamber is open to increase the strength of the weld.

The method of quality control of the invention can nonetheless be conducted independently of the device in which the conductors are welded, even if preferably the welding and the checking of the welded conductors, such as especially litz wires welded to transit and end nodes, takes place in one and the same device.

Thus the welded conductors can be arranged between a first element applying ultrasound vibrations, such as a sonotrode, and a second element, such as a counter electrode. Then ultrasound or ultrasound vibrations are applied and the change in spacing between the first and the second element with simultaneous application of pressure to the welded conductors that took place during or after the application can be measured. An evaluation as to whether the welded conductors correspond to the quality standards is then performed in the previously described manner on the basis of the change in spacing between the first and the second element. Should a change in spacing between the first and second element take place in an impermissible manner, the conclusion may be drawn that the welded connection does not meet the standards imposed.

With regard to the quality verification described above, parameters and measuring methods that have been discussed above are applied for checking the quality of the welded conductors.

BRIEF DESCRIPTION OF THE DRAWINGS

Further particularities, advantages and features of the invention emerge not only from the claims, the features to be inferred from the latter—by themselves and/or in combination—but also on the basis of the preferred embodiments to be inferred from the subsequent description of the drawings, wherein:

DESCRIPTION OF THE PREFERRED EMBODIMENTS

Figure 1:
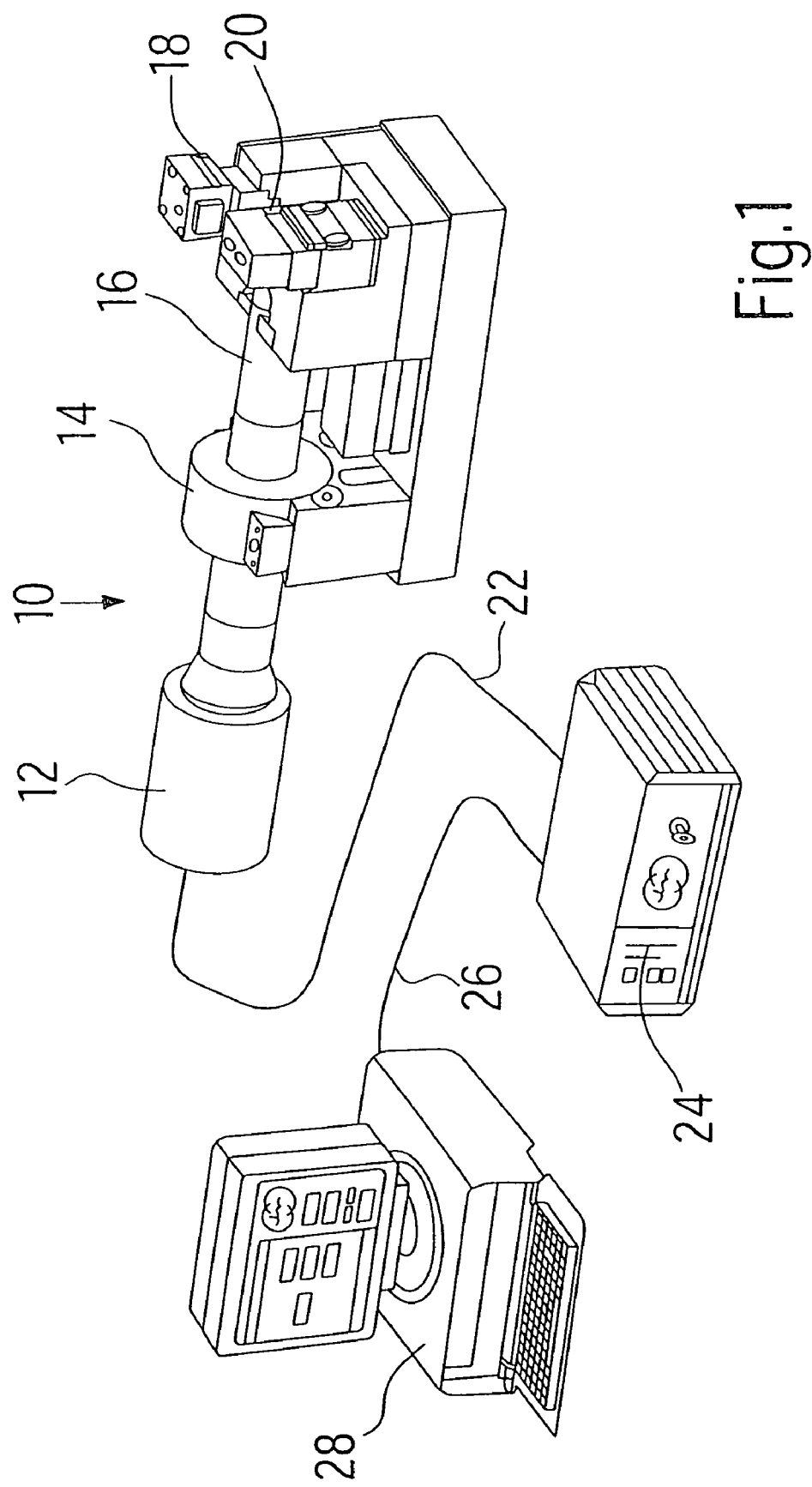
FIG. 1 Is a basic representation of an ultrasound welding arrangement.

An arrangement is represented purely in outline in FIG. 1 with which in particular electrical conductors are welded using ultrasound into end or transit nodes. The arrangement includes an ultrasound welding device or machine 10 which in the usual manner includes a converter 12, or if need be a booster 14 as well as a sonotrode 16. The sonotrode 16 or a surface of this is allocated a multipart counter electrode 18 (also called an anvil) as well as a slider 20, as can be taken from DE-C-37 19 083, to the disclosure of which reference is expressly made. The sonotrode 16 or its surface, the counter electrode 18, and the slider 20 bound a compression chamber adjustable in cross section, which is explained in greater detail on the basis of FIG. 2-4. The elements to be welded, such as conductors, are introduced into the compression chamber.

The converter 12 is connected via a conductor 22 with a generator 24, which in turn leads via a line 26 to a PC 28, which is used to control the welding process and in which welding parameters or cross section in relation to conductors to be welded can be input or corresponding stored values can be called up.

Figure 2:
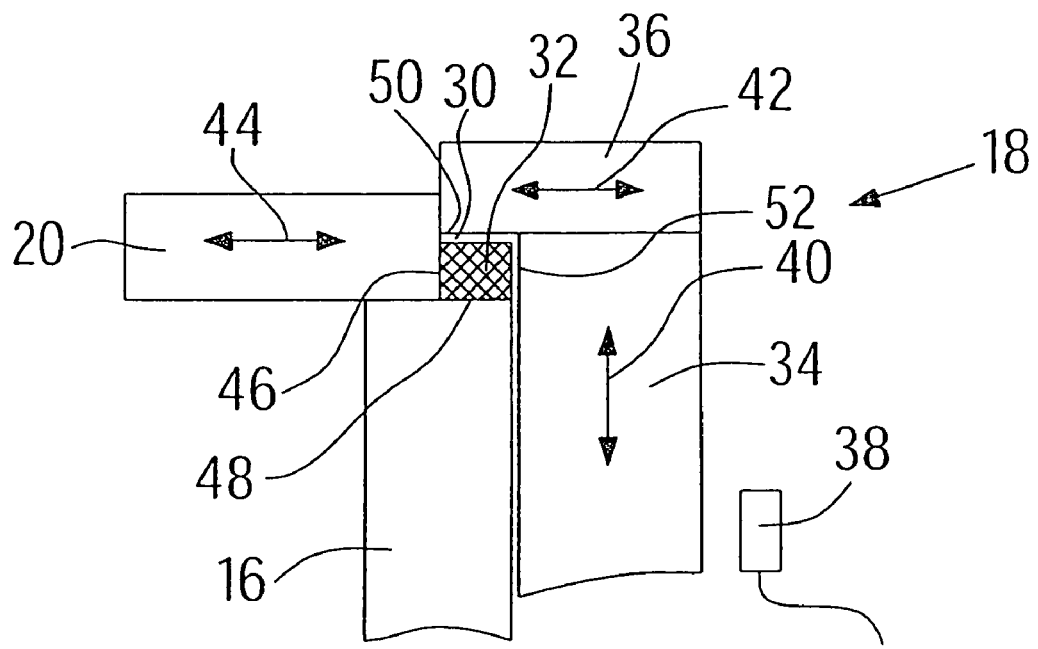
FIG. 2 Represents a compression chamber of an ultrasound welding device in an initial position, FIG. 3 Illustrates the compression chamber in accordance with FIG. 2 in a second position and FIG. 4 Shows a further embodiment of the compression chamber.

As is apparent from FIG. 2, the ultrasound welding device 10 has a compression chamber 30 that is bounded by the sonotrode 16, the counter electrode 18, and the lateral slider 20, in which conductors 32 to be welded are introduced in the embodiment. The counter electrode 18 consists of a vertically adjustable column or plate 34 from which a horizontally displaceable transverse slider 36 proceeds. Furthermore, a displacement pickup 38 is allocated to the vertically adjustable plate 34. The motion of the vertical plate 34, the transverse slider 36, and the lateral slider 20 is symbolized by the double arrows 40, 42, 44.

Once the conductors 32 have been introduced into the compression chamber 30, the lateral slider 20 is first moved in the direction of the conductor 32. The transverse slider 36 is correspondingly positioned so that this can be moved along the slider 20 when the plate 34 is moved vertically, that is, along its surface 46 that borders the compression chamber 30. The lower boundary surface of the compression chamber 30 is formed by a surface 48 of the sonotrode 16. The opposite boundary surface is a surface 50 of the transverse slider 36. The remaining boundary surface 52 of the compression chamber 30, which runs parallel to the boundary surface 46, is formed by the vertical plate 34.

When the compression chamber 30 is closed, first a compacting of the conductors 32 and then a welding of these takes place in which the sonotrode 16 is placed in ultrasound vibration. At the same time the counter electrode 18—also called the anvil—is adjusted in the direction of the arrow 40 in the direction of the boundary surface 48 of the sonotrode 16 (arrow 40), whereby a requisite force or pressure action upon the conductors 32 takes place.

Figure 3:
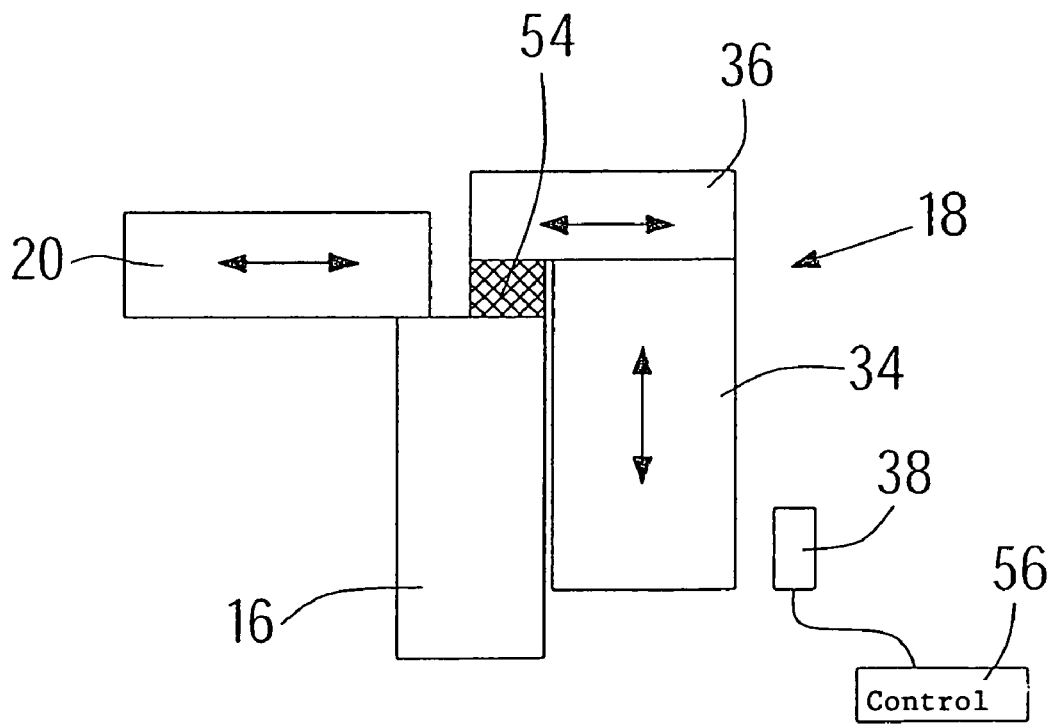

Once the welding process has been completed, thus once a node 54 is produced, the lateral slider 20 is relieved of pressure according to the representation of FIG. 3. This can also take place through the unlocking or release of the lateral slider 20 so that the latter can be shifted in the direction of the arrow 49 via forces transmitted to the welded nodes 54. A decompression can also take place in that the compression chamber 30 is opened by adjusting the lateral slider 20. Then ultrasound or an ultrasound pulse with suitable amplitude and duration is transmitted via the sonotrode 16 to the nodes 54 with the further application of pressure to the nodes 54 via the counter electrode 18 or the transverse slider 36. In this way, the conductors or the litz wires of the nodes 54 can yield in the direction of the lateral slider 20, to an extent that is dependent upon the degree to which the node 54 possesses the requisite strength. Since there exists an action of force on the nodes 54 via the transverse slider 36, when the conductors or litz wires yield to this motion, a vertical motion of the counter electrode 18 takes place, which is measured by the displacement pickup 38 and forwarded to a control unit 56. On the basis of the change in path ascertained via the displacement pickup 38, it can be established via the control unit 56 whether or not the node 54 possesses the required strength and thereby the necessary quality. For with a sufficient strength of the node 54, only a minimal motion of the counter electrode 18 is measured by the displacement pickup 38.

Thus there results, for example, with a node having a cross section of 1.5 mm$^2$ a path change of ca 0.05 mm if the requisite strength exists. If this is not the case there results, for example, a path change of ca. 0.2 mm with a test pressure of 2 bar and a sound pulse duration of 40 ms, which signals that the node does not possess the strength required for further processing.

For nodes having a cross section of, for example, 10.5 mm$^2$ a path change of ca. 0.03 mm results if the requisite strength exists. For nodes that are not fast there results, for example, a path change of ca. 0.1 mm with a test pressure of 3 bar and a sound pulse duration of 55 ms.

Figure 4:
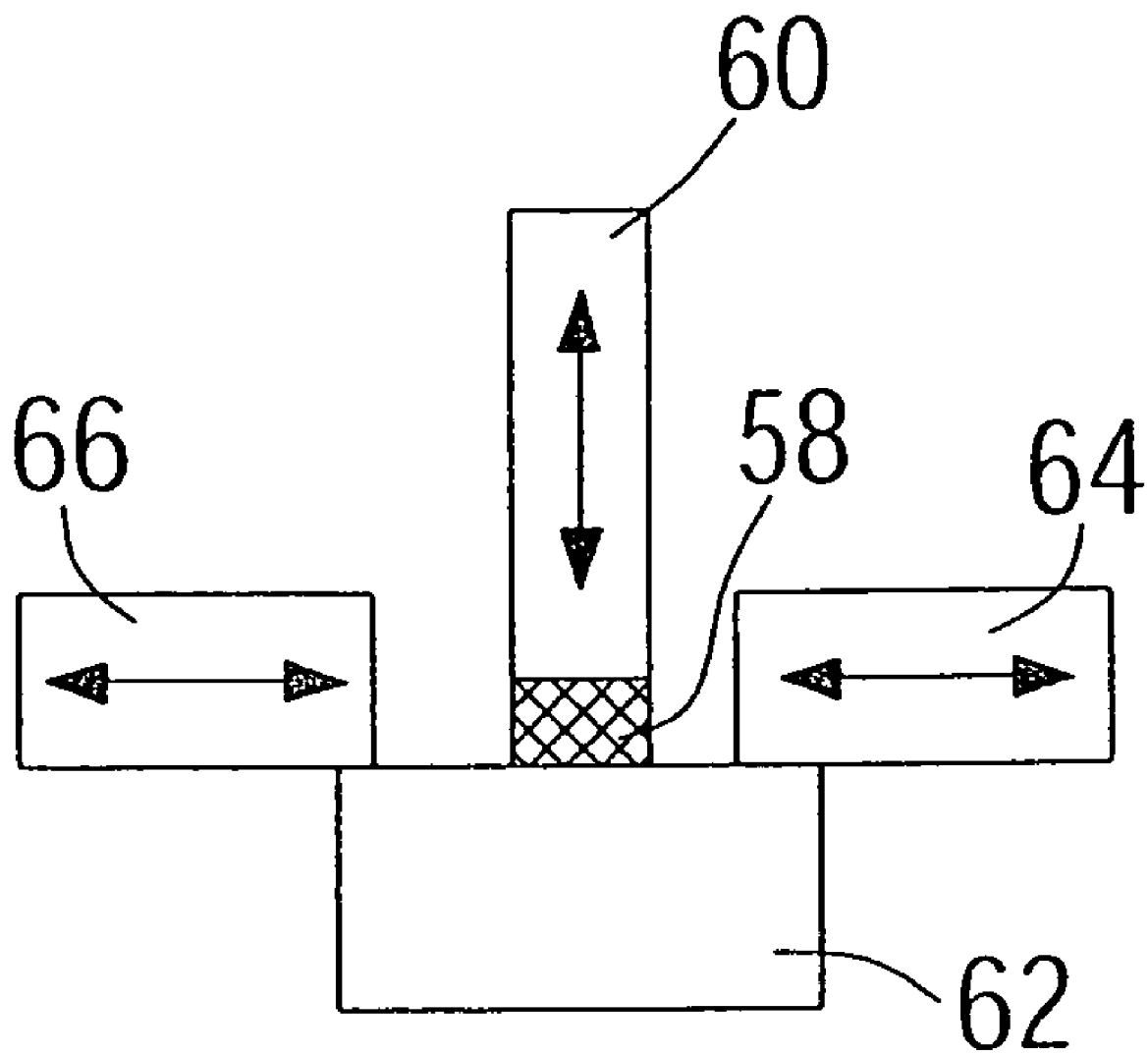

In accordance with the basic representation of FIG. 4, a quality or strength check can also take place when a compression chamber is decompressed not only unilaterally, but also multilaterally. It is alone decisive that a manufactured node 58 is arranged between a counter electrode 62 that enables an action of pressure and an ultrasound-applying sonotrode 60, as can essentially be inferred from FIG. 4. Moreover, remaining boundary surfaces of the compression chamber that surrounds the node 58 during welding are formed by lateral sliders 64, 66, which are decompressed and laterally moved away during the further action of ultrasound and pressure. Corresponding to the representation in accordance with FIG. 4, the element 62 can also be a carrier to be welded with the litz wire which in turn is supported on the electrode or the anvil, which is not represented in connection with this variant.

The theory according to the invention can moreover be extended such that should it turn out in the quality check that a node does not have the requisite strength, a further sound effect takes place with simultaneous action of pressure, whereby the node 54 almost flows apart and is consequently destroyed so that consideration in a finishing process is no longer possible.

There also exists the possibility of selectively recompressing sufficiently solid nodes. This can take place when the compression chamber is open to increase node strength, in other words if furthermore ultrasound impulses are introduced with simultaneous action of pressure.

If the invention has been explained on the basis of the welding of litz wires, this is not intended as a restriction of the theory of the invention. For example, a verification of the solidity of litz wires welded to a carrier is also possible. Here the carrier preferably forms a boundary of the compression chamber. Thus the carrier is braced on the counter electrode. The action of pressure then takes place through the sonotrode. Alternatively the litz wires can be arranged on the sonotrode and then the carrier can be arranged on this. The action of pressure takes place via the counter electrode or anvil that is braced on the carrier.

If a checking of the welded conductors, such as transit or end nodes, has been undertaken on the basis of the previous presented description in the same ultrasound welding device in which the welding of the conductors or the litz wires itself takes place, then there is likewise no departure from the invention if a quality check is conducted in a separate machine which has as its main components a sonotrode transmitting ultrasound vibrations and a counter electrode or an anvil allocated to the sonotrode. Conductors such as transit or end nodes, or litz wires welded onto a carrier, which are to be checked for their strength are then arranged between the sonotrode and the anvil to introduce an ultrasound pulse with simultaneous action of pressure on the welded conductors in the previously described manner. At the same time the change in spacing between the sonotrode and the anvil is measured in order to draw conclusions with regard to the strength of the welding site.

A quality control method of this type has the advantage that conductors welded in various welding devices can, for example, be checked at a central location without the normal welding sequence being affected.

The invention claimed is:

1. Method for welding electric conductors using ultrasound, comprising the steps of:
   introducing the conductors into a compression chamber that is bounded by at least two boundary elements;
   closing the compression chamber and welding the conductors by applying ultrasound thereto via a first boundary element which is a sonotrode, the conductors being acted upon during welding by pressure via the sonotrode or a second boundary element; and
   after welding the conductors, decompressing the compression chamber, then applying further ultrasound to the welded conductors within the decompressed chamber, with measurement of a characteristic magnitude of the compression chamber resulting from said applying further ultrasound, to determine weld quality.

2. Method according to claim 1, wherein the compression chamber is bounded by at least three elements, and after the welding, at least one previously fixed and locked element in relation to the welded conductor is decompressed and unlatched.

3. Method according to claim 1, wherein the characteristic magnitude is a geometric value selected from the group consisting of height, width and diagonal length of the compression chamber.

4. Method according to claim 3, wherein the geometric value is the spacing between the first and second elements.

5. Method according to claim 3, wherein the geometric value is measured by a displacement pickup.

6. Method for checking quality of conductors that have been welded in a compression chamber of an ultrasound welding device, the compression chamber being bounded at least by a sonotrode first element which applies ultrasound and a second element, comprising the steps of:
   introducing the conductors to be welded into the compression chamber;
   compacting and welding the conductors with simultaneous cross section diminution of the compression chamber, the conductors being acted upon by pressure via the second or first element;
   decompressing the compression chamber, the welded conductors remaining between the first element and the second element;
   renewing application of ultrasound with simultaneous action of pressure on the welded conductors via at least one of the first and the second elements within the decompressed chamber; and
   measuring a characteristic magnitude of the compression chamber and/or shape of the welded conductors resulting from the renewed application of ultrasound.

7. Method according to claim 6, wherein the conductors are subjected to pressure via the second element.

8. Method according to claim 6, wherein the quality of the welding is evaluated as a function of the measured characteristic magnitude of the compression chamber and/or the shape of the welded conductors.

9. Method according to claim 6, wherein the characteristic magnitudes of the compression chamber measured is at least one of height, width and diagonal length of the compression chamber.

10. Method according to claim 9, wherein the characteristic magnitude is measured using a displacement pickup.

11. Method according to claim 6, wherein the renewed application of ultrasound takes place over a duration T with $10 \text{ ms} \leq T \leq 250 \text{ ms}$.

12. Method according to claim 6, wherein the renewed application of ultrasound with simultaneous action by pressure on the welded conductors takes place with a pressure P with $1 \text{ bar} \leq P \leq 4 \text{ bar}$.

13. Method according to claim 6, wherein the renewed application of ultrasound with simultaneous action of pressure is applied when the compression chamber is open to substantially destroy the weld when welds of lesser quality are established on the welded conductors.

14. Method according to claim 6, wherein renewed application of ultrasound with simultaneous action of pressure is applied with a decompressed pressure chamber for selective recompression of the weld when proper welding on the welded conductors is established.

15. Method according to claim 6, wherein changes in spacing between the first and second elements with simultaneous action of pressure on the welded conductors taking place during or after the application are measured.

* * * * *